United States Patent Office 3,411,506
Patented Nov. 19, 1968

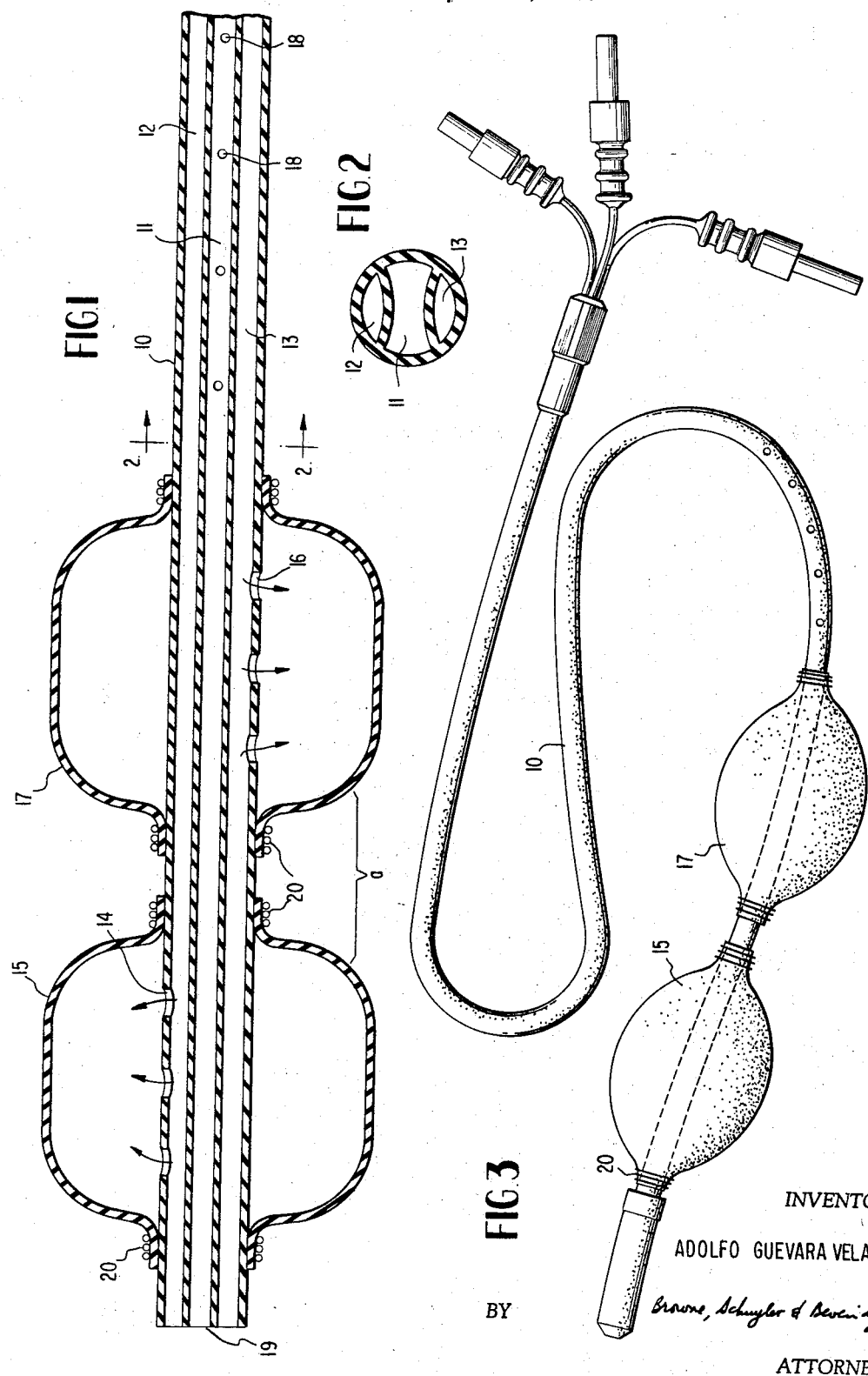

3,411,506
METHOD AND APPARATUS FOR HEMOSTASIS
Adolfo Guevara Velasco, Av. Tacna 543, of. 63,
Lima, Peru
Filed Apr. 11, 1966, Ser. No. 541,796
11 Claims. (Cl. 128—325)

The present invention relates to a method and to an apparatus for hemostasis in bleeding duodenal ulcers by physical means and especially a method to induce this hemostasis by the compression and coaptation, intraluminally, by means of a two bulb dilatable catheter that adjusts itself on both sides of the pyloric sphincter.

Duodenal ulcers occur, in general, in the portion of the duodenum near the pyloric sphincter-duodenal bulbous. When advanced, it produces a rupture of the blood vessels, causing hemorrhage; namely, bleeding duodenal ulcers. Many methods have been used to induce the hemostasis in bleeding ulcers and to reduce the amount of active gastric juices in the ulcerated area until the generation of the healing tissue. These methods have mainly been in the use of medication that produces an increase in the blood coagulation index or contractions on the walls of the blood vessels while gastric contents are reduced to avoid extending the wearing away of the ulcer with gastric juice or pepsin. Catheters have been used with a dilatable bulb in intestinal obstruction, but these catheters could not be used until now in the treatment of bleeding duodenal ulcers; nor have they been used for the hemostasis within the duodenal bulbous.

In accordance with the present invention, a method and apparatus is furnished by which the hemostasis in duodenal ulcer hemorrhage is induced by means of an element that presses gently and firmly against the ulcerated part and which prevents its displacement by the peristaltic duodenal contractions. Moreover, the present invention enables the extraction of the gastric contents in an independent form without contacting the ulcerated tissue.

It is therefore the object of the invention to provide a method to induce the hemostasis in hemorrhages of duodenal ulcers by applying a controlled pressure on the ulcerated tissue to repress the bundle of erodent blood vessels, stopping or lessening the blood flow at the affected part.

Another object of the present invention is to provide a method to isolate the ulcerated region from the action of gastric juice by means of free extraction of all gastric contents from the patient.

Another object of the present invention is to provide a method for the hemostasis of bleeding duodenal ulcers until thrombosis on the affected vessels has occurred.

Still another object of the present invention is to provide an apparatus of tracheotomy that induces hemostasis and isolates the region in treatment and acts as an extractor of gastric contents.

The above as well as other objects and advantages will be apparent from the following detailed description of the invention taken in conjunction with the drawings in which:

FIG. 1 represents a cross-sectional view showing the principal body or element of the catheter containing enlarged balloons;

FIG. 2 represents a transverse cross-sectional view at 3—3 shown in FIG. 1, and shows the three independent passages; and FIG. 3 shows the catheter of the present invention.

Referring to the figures, the catheter is shaped as a tubular body that encloses three independent longitudinal conduits 11, 12 and 13.

As it is of common use, this body is made of a material such as rubber or any other suitable flexible material of similar properties of resiliency. It may be desirable for the flexible material to be impervious to X-rays.

Conduit 11, the principal conduit, forms the structure of the catheter and through which gastric contents are extracted by suction through ports 18.

Conduit 12 extends parallel to conduit 11 and contains at one end of the catheter, openings 14 that communicate with the internal cavity of balloon 15, hermetically fastened to the body of the catheter by means of fastening means 20. The distal end of conduit 11 is sealed or blocked as it is shown in 19. The other end, which is not shown in the drawings, is placed back to back to a clyster pipe through which the air of balloon 15 can be insufflated, retained or extracted at the surgical operator's will.

Conduit 13 also extends parallel to conduits 11 and 12 and it is also blocked at its distal end 19, having spaced ports 16 that communicate with the internal portion of the second balloon 17 disposed separately from balloon 15 by the distance $a$ that will be explained later. Conduit 13 also has placed back to back on its open end an independent clyster pipe to insufflate, retain or extract the air contained in balloon 17. The head or distal end of the catheter that is not shown in the drawings is fitted at 19 with a manageable bag that contains mercury or other weight in an appropriate quantity in accordance with the technique for the lowering of the catheter through the system to its position in the pyloric bulbous.

The variations of the mentioned depositive conduits 12 and 13 can be independent of the principal body 10 and extend parallel to it, forming a parcel. Also conduit 11 can have an opening at the distal end in which case the mercury bag is put in the tubular section of the catheter, keeping free the perforated distal end for the purpose of extracting liquids or gas hoarded up in the duodenum.

The catheter is applied to the patient, previously prepared, by mouth or nose, with deflated balloons until it is situated in the stomach, whereby means of adequate handling and because of the weight and mercury fluidness, the catheter will slide through the pylorus until it gets to the third or fourth part of the duodenum.

At this moment the operator insufflates air into balloon 15 until its expanded walls adapt themselves to the conformation of the duodenal bulbous and then the catheter is permitted to slide, smoothly, by traction, to the gastric cavity into which it cannot pass because of the narrowness of the pylorus sphincter. In this way the passage is totally blocked up and the balloon is exactly located in the duodenal bulbous pressing the ulcerated region and producing its hemostatic effects and coaptation. Through conduit 13, air is insufflated with the object of inflating balloon 17 that is separated from balloon 15 by a distance $a$ that represents the length of the pylorus. Balloon 17, located in the pre-pyloric zone, serves as a stop so that the catheter maintains its constant position counterchecking sliding material by peristaltus contractions of the duodenal stretch. While the pylorus is pressed between both balloons, the operator can, while maintaining the compression on the pyloric valve, proceed to the aspiration, by known techniques, of the gastric contents through conduit 11.

This apparatus has, as it can be seen, a double function: while expanded balloon 15 presses softly and firmly against the ulcerated zone producing compression of the expanded vessels and blocking up the capillaries making an effective hemostatic effect and of corresponding coaptation, located and firmly retained by retention balloon 17 the main conduit 11 of the catheter accomplishes the aspiration of the gastric contents and optionally the accumulated liquids and gas in the duodenal bulbous through ports 18. The process of coaptation and thrombosis of the affected blood vessels takes a time that differs from 48 to 72 hours at the end of which the balloons are deflated to take out the catheter.

The catheter of this invention has marks at different levels to point out the position and progress along the gastrointestinal stretch.

I claim:

1. A method for inducing hemostasis in hemorrhaging duodenal ulcers comprising inserting an inflatable hemostatic catheter through the esophagus to the region of the pyloric valve; inflating said hemostatic catheter on both sides of pyloric valve, said inflated catheter pressing on blood vessels in pyloric region and maintaining said expansion for a sufficient period of time for thrombosis of the blood vessels to occur.

2. A method for inducing hemostasis as defined in claim 1 wherein said inflatable hemostatic catheter is comprised of an elongated tubular body, closed at distal end, axially divided into three compartments; two inflatable bodies surrounding and attached to said tubular body at a predetermined distance from said closed end and from each other, a means for positioning of said catheter in pyloric region attached to closed end of catheter; a means for inflating said inflatable bodies, and a means for extracting fluid from pyloric region.

3. A method for inducing hemostasis as defined in claim 1 wherein said elongated body has one compartment in communication with each inflatable body, a means for inflating each inflatable body independently and a means for removing fluid from pyloric region through compartment not in communication with said inflatable bodies.

4. A method for inducing hemostasis as defined in claim 1 wherein said compartment not in communication with said inflatable bodies has drainage openings into said compartment by means of which fluid from pyloric region can be removed.

5. A method for inducing hemostasis as defined in claim 1, wherein inflatable body nearest to closed end of said catheter is expanded after passing through pyloric valve, said expanded body pressing against blood vessels inducing thrombosis, said second inflatable body is then expanded above pyloric valve restricting movement of catheter and said first expanded body from pyloric valve region.

6. A method for inducing hemostasis as defined in claim 1, wherein said open end of said catheter has means by which said compartments can be connected to a source of pressure and vacuum.

7. An inflatable hemostatic catheter comprising an elongated tubular body, closed at distal end, axially divided into three compartments; two inflatable bodies surrounding and attached to said closed end at a predetermined distance from said closed end and from each other, a means for positioning of said catheter in pyloric region attached to closed end of catheter; a means for inflating said inflatable bodies, and a means for extracting fluid from pyloric region.

8. An inflatable hemostatic catheter as defined in claim 7, wherein said elongated body has one compartment in communication with each inflatable body, a means for inflating each inflatable body independently and a means for removing fluid from pyloric region through compartment not in communication with said inflatable bodies.

9. An inflatable hemostatic catheter as defined in claim 7 wherein said compartment not in communication with said inflatable bodies has drainage openings into said compartment by means of which fluid from pyloric region can be removed.

10. An inflatable hemostatic catheter as defined in claim 7 wherein said open end of said catheter has means by which said compartments can be connected to a source of pressure and vacuum.

11. An inflatable hemostatic catheter as defined in claim 7 wherein said inflatable bodies are separated from each other by a distance equal to length of pyloric valve.

References Cited

UNITED STATES PATENTS

| | | | |
|---|---|---|---|
| 2,849,002 | 8/1958 | Oddo | 128—325 |
| 3,154,077 | 10/1964 | Cannon | 128—325 |

L. W. TRAPP, *Primary Examiner.*